(12) United States Patent
Yamazaki

(10) Patent No.: US 7,130,518 B2
(45) Date of Patent: Oct. 31, 2006

(54) OPTICAL COUPLER, BEAM SPLITTER, AND ARRAYED WAVEGUIDE GRATING TYPE OPTICAL WAVELENGTH DIVISION MULTIPLEXER

(75) Inventor: Hiroyuki Yamazaki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 11/011,118

(22) Filed: Dec. 15, 2004

(65) Prior Publication Data
US 2005/0135748 A1 Jun. 23, 2005

(30) Foreign Application Priority Data
Dec. 19, 2003 (JP) ............... 2003-421814

(51) Int. Cl.
*G02B 6/10* (2006.01)
(52) U.S. Cl. .................. 385/129; 385/37; 385/45
(58) Field of Classification Search ............ 385/37, 385/129
See application file for complete search history.

(56) References Cited

U.S. PATENT DOCUMENTS

| | | | |
|---|---|---|---|
| 5,745,618 A * | 4/1998 | Li ................. | 385/46 |
| 6,697,552 B1 * | 2/2004 | McGreer et al. .......... | 385/37 |
| 6,873,766 B1 * | 3/2005 | Dragone ................ | 385/39 |
| 6,892,004 B1 * | 5/2005 | Yu ................... | 385/39 |
| 7,006,729 B1 * | 2/2006 | Wang et al. ........... | 385/37 |
| 7,046,872 B1 * | 5/2006 | Sakuma et al. ........... | 385/16 |
| 2002/0054727 A1 * | 5/2002 | Song ................. | 385/16 |
| 2002/0090190 A1 | 7/2002 | Lin et al. | |
| 2003/0081898 A1 | 5/2003 | Tabuchi et al. | |
| 2003/0194181 A1 | 10/2003 | Dragone | |

FOREIGN PATENT DOCUMENTS

| | | |
|---|---|---|
| EP | 0 856 755 A1 | 8/1998 |
| JP | 10-274719 | 10/1998 |
| JP | 2000-147283 A | 5/2000 |

* cited by examiner

*Primary Examiner*—Ellen E. Kim
(74) *Attorney, Agent, or Firm*—Foley & Lardner LLP

(57) ABSTRACT

An optical coupler, a beam splitter, and an AWG, according to the present invention are each provided with a transition region for the attainment of a low loss and can effectively prevent the reflection of optical signals which occurs in the transition region. The optical coupler, beam splitter, and AWG, according to the present invention are each provided with a slab waveguide 55, plural waveguides $62_1, 62_2, \ldots, 62_{10}$ for the output of optical signals and further provided with plural waveguide paths 63 for connecting adjacent ones of the waveguides $62_1, 62_2, \ldots, 62_{10}$. The waveguide paths 63 adjacent with respect to each of the waveguides are positioned at different distances from the slab waveguide 55.

31 Claims, 11 Drawing Sheets

EQUIVALENT REFRACTIVE INDEX

EQUIVALENT REFRACTIVE INDEX

OPTICAL COUPLER, BEAM SPLITTER, AND ARRAYED WAVEGUIDE GRATING TYPE OPTICAL WAVELENGTH DIVISION MULTIPLEXER

BACKGROUND OF THE INVENTION

1. Field of the Invention

The present invention relates to an optical coupler for branching or coupling optical signals, a beam splitter for branching optical signals, and an AWG (Arrayed Waveguide Grating type optical wavelength division multiplexer) for combining or branching optical signals. Particularly, the present invention is concerned with an optical coupler, a beam splitter, and an AWG, of a low loss type.

2. Description of Related Art

With an increase of the information transmission volume, a WDM (Wavelength Division Multiplexing) transmission system capable of remarkably increasing the transmission capacity is in wide commercial use. In this WDM transmission system, optical signals of plural wavelengths are transmitted using a single optical fiber. Therefore, optical wavelength division multiplexers are needed at input and output portions of the optical fiber which serves as a transmission path. The optical wavelength division multiplexer combines optical signals of plural wavelengths for transmitting them with use of a single optical fiber or branches wavelength-division-multiplexed optical signals transmitted using a single optical fiber into respective wavelengths. An AWG (Arrayed Waveguide Grating type optical wavelength division multiplexer) can perform optical wavelength division multiplex/demultiplex at wavelength intervals of the order of several tens of GHz to 100 GHz. For this reason the AWG is in wide use as a key device in a WDM transmission system.

In the AWG, wavelength-division-multiplexed optical signals are inputted at an equal phase to arrayed waveguides by means of a first slab waveguide. The thus-divided optical signals of the same phase are given a phase difference by being propagated through the arrayed waveguides of different optical path lengths. Next, the optical signal thus given a phase difference are inputted to a second slab waveguide. Within the second slab waveguide, light condensing positions of the optical signals are different wavelength by wavelength. Therefore, the optical signals are divided into respective wavelengths and then outputted by means of output waveguides disposed at light condensing positions of corresponding wavelengths. It is important for the AWG, as a passive part, to be as low as possible in its optical signal propagation loss. Thus, the attainment of a low loss is demanded.

One cause of loss peculiar to the AWG is that, when optical signals are propagated from the slab waveguide to the arrayed waveguides, a portion thereof leaks from between adjacent arrayed waveguides and is not incident on the arrayed waveguides. In the connections between the arrayed waveguides and the slab waveguide there occurs a loss of 1 to 2 dB (decibel) due to such leakage of light. Methods for diminishing this loss have heretofore been proposed, for example the method disclosed in Japanese Unexamined Patent Publication No. 2000-147283 (paragraph 0013, FIG. 1). In this method, as the first conventional example, tapered waveguides which is inclined in a tapered manner are formed at the position where light is inputted from the slab waveguide to the arrayed waveguides.

FIG. 1 shows a principal portion of an AWG used in this first conventional example. Wedge-like tapered waveguides 13 as buried layers are formed around connections between a slab waveguide 11 and plural arrayed waveguides $12_1$, $12_2$, ..., $12_5$, ... in the AWG indicated at 10. The tapered waveguides 13 are formed by etching. In the connections of the arrayed waveguides $12_1$, $12_2$, ..., $12_5$, ... to the slab waveguide 11, the height of the tapered waveguides 13 is almost equal to that of the slab waveguide 11 and becomes smaller with separation from the slab waveguide 11.

Consequently, in the connections between the slab waveguide 11 and the arrayed waveguides $12_1$, $12_2$, ..., $12_5$, ... in the AWG 10, an electromagnetic field distribution changes gradually. Therefore, optical signals having been propagated through the slab waveguide 11 are incident without leakage on the connections with the arrayed waveguides $12_1$, $12_2$, ..., $12_5$, ... As a result, it is possible to attain a low loss. Reversibly, optical signals having been propagated through the arrayed waveguides $12_1$, $12_2$, ..., $12_5$, ... can be incident on the slab waveguide 11 at a low loss.

However, in forming the wedge-like tapered waveguides 13, it is necessary that an inclination be formed by changing the etched depth (height) gradually. Consequently, there arises the problem that it is necessary to use such a special photomask or etching method as causes a continuous change of light quantity. Thus, an obstacle is encountered in the productivity of the tapered waveguides 13. Further, the light propagation characteristic greatly changes depending on the thickness of the tapered waveguides 13 formed among the arrayed waveguides $12_1$, $12_2$, ..., $12_5$, .... It is therefore necessary to control the inclination of each tapered waveguide 13 with a high accuracy. Thus, a problem is encountered in point of reproducibility and uniformity of the shape of the tapered waveguides 13.

In an effort to solve this problem there has been proposed such a second method as in for example Japanese Unexamined Patent Publication No. Hei 10(1998)-274719 (see paragraphs 0010 and 0012, FIGS. 1 and 2) in which mesh-like waveguides are formed in connections between a slab waveguide and arrayed waveguides to diminish an insertion loss.

FIG. 2 shows, for reference, a slab waveguide and the vicinity thereof in an ordinary AWG, while FIG. 3 shows a slab waveguide and the vicinity thereof in the second conventional example referred to above. In the ordinary AWG 20 shown in FIG. 2, input waveguides 22 and output waveguides 23 are simply connected to a slab waveguide 21.

On the otherhand, in the AWG 30 of the second conventional example shown in FIG. 3, input waveguides 32 are not specially different from that shown in FIG. 2, output waveguides 33 have a transition region 34 in the vicinity of their connections with a slab waveguide 31. The transition region 34 is formed by plural waveguide paths 35 extending across the output waveguides 33. Although in the figure the waveguide paths 35 are shown in a reduced number, actually 20 to 40, preferably about 30, waveguide paths 35 are present. The waveguide paths 35 are formed of the same material as the material of the output waveguides 33. Therefore, the waveguide paths 35 can be manufactured in the same step as the step of manufacturing the slab waveguide 31 and the output waveguides 33 which constitute the AWG 30. The waveguide paths 35 are gradually smaller in width with separation from the slab waveguide 31. This is because with separation from the slab waveguide 31 the leakage of optical signals among the output waveguides 33 decreases gradually, and is to decrease the leakage through the waveguide paths 35 of optical signals under propagation through the output waveguides 33. Consequently, optical signals under propagation among the output waveguides 33 can be picked up into the output waveguides 33 effectively by the waveguide paths 35. In the AWG 30 of this second conventional example, the insertion loss can be decreased by the presence of the transition region 34. As an example, in a typical star coupler, the insertion loss can be decreased from about 0.8 dB to about 0.3 dB.

However, in the AWG 30 of the second conventional example, periodic changes in refractive index occur in the connections between the output waveguides 33 and the waveguide paths 35 extending across the output waveguides. As a result, optical signals of a specific wavelength are accumulated and appear as reflection. This reflection causes ripple, cross talk, and distortion, in the optical wavelength division multiplex/demultiplex characteristic of the optical wavelength division multiplexer and thus exerts a bad influence thereon.

SUMMARY OF THE INVENTION

According to the present invention there are provided an optical coupler, a beam splitter, and an AWG, which are provided with a transition region for attaining a low loss and which can effectively prevent the reflection of optical signals occurring in the transition region.

The optical coupler according to the present invention comprises a slab waveguide, one or more input waveguides for inputting optical signals to the slab waveguide, plural output waveguides for outputting optical signals from the slab waveguides, and plural waveguide paths for connecting adjacent ones of the output waveguides. The waveguide paths adjacent to each other with respect to each of the output waveguides are positioned at mutually different distances from the slab waveguide.

Thus, the optical coupler according to the present invention is provided with waveguide paths for connecting adjacent output waveguides through which optical signals are outputted. The waveguide paths are arranged in such a manner that the waveguide paths positioned on the right and left sides of each of the output waveguides are different in their distances from the slab waveguide. Consequently, in each output waveguide, a rise in equivalent refractive index caused by an arrangement of the waveguide paths is decreased and reflection becomes difficult to occur.

The beam splitter according to the present invention comprises an input waveguide, plural output waveguides connected to the input waveguide to output optical signals, and plural waveguide paths for connecting adjacent ones of the output waveguides. The waveguide paths adjacent to each other with respect to each of the output waveguides are positioned at mutually different distances from the input waveguide.

Thus, the beam splitter according to the present invention is provided with waveguide paths for connecting adjacent output waveguides through which optical signals are outputted. The waveguide paths are arranged in such a manner that the waveguide paths positioned on the right and left sides of each of the output waveguides are different in their distances from the input waveguide. Consequently, in each output waveguide, a rise in equivalent refractive index caused by an arrangement of the waveguide paths is decreased and reflection becomes difficult to occur.

The arrayed waveguide grating type optical waveguide division multiplexer according to the present invention comprises one or more input waveguides for the input of optical signals, a first slab waveguide coupled to the input waveguides to branch the optical signals, plural arrayed waveguides coupled to another side of the first slab waveguide to impart a phase difference to each of the optical signals, a second slab waveguide coupled to another side of the arrayed waveguides to branch and output the optical signals, plural output waveguides coupled to another side of the second slab waveguide to output the optical signals, and waveguide paths for connecting adjacent ones of the arrayed waveguides, the waveguide paths being positioned near one or both of the first and second slab waveguides. The waveguide paths adjacent to each other with respect to each of the arrayed waveguides are positioned at mutually different distances from the first or the second slab waveguide.

Thus, the arrayed waveguide grating type optical wavelength division multiplexer according to the present invention is provided with waveguide paths for connecting adjacent ones of arrayed waveguides in which optical signals are outputted from the first slab waveguide. The waveguide paths are arranged in such a manner that the waveguide paths positioned on the right and left sides of each output waveguide are mutually different in their distances from the first or the second slab waveguide. Consequently, in each output waveguide, a rise in equivalent refractive index caused by an arrangement of the waveguide paths is decreased and reflection becomes difficult to occur.

The waveguide paths may satisfy the following conditions.

(1) The waveguide paths connect adjacent output waveguides or arrayed waveguides alternately right and left.

(2) Adjacent waveguide paths are dislocated from each other in the longitudinal direction of output waveguides or arrayed waveguides.

(3) The waveguide paths are arranged at random intervals in the longitudinal direction of output waveguides.

(4) The waveguide paths are arranged at gradually longer-intervals in the longitudinal direction of output waveguides or arrayed waveguides.

(5) The waveguide paths become thinner with separation from a slab waveguide or an input waveguide.

(6) The waveguide paths are arranged so as to be inlined with respect to output waveguides or arrayed waveguides.

(7) The waveguide paths are different in width between output waveguides or arrayed waveguides to which the waveguide paths are connected.

BRIEF DESCRIPTION OF THE DRAWINGS

The above and other objects, features and advantages of, the present invention will become more apparent from the following detailed description when taken in conjunction with the accompanying drawings wherein.

DETAILED DESCRIPTION OF THE PREFERRED EMBODIMENTS

Basic constructions of an optical coupler, a beam splitter, and an AWG, according to the present invention, as well as operation principles thereof, will be described in detail hereinbelow.

First, a description will be given of a basic construction of an AWG (Arrayed Waveguide Grating type optical wavelength division multiplexer) according to a first embodiment of the present invention.

Figure 4:
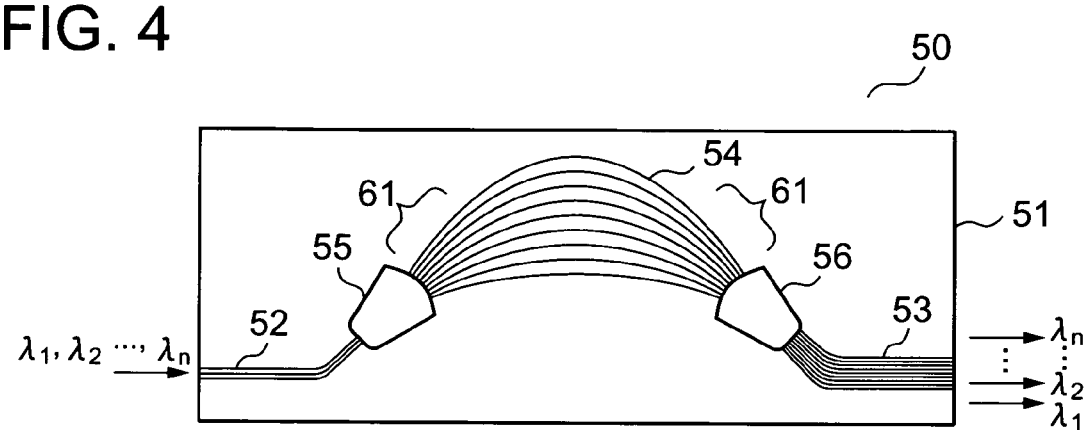
FIG. 4 is a schematic construction diagram of an AWG according to-a first embodiment of the present invention.

FIG. 4 shows an outline of the AWG of the first embodiment. One or more first channel waveguides 52, plural second channel waveguides 53, and arrayed waveguides 54 which are bent in certain directions at different radii of curvature, are arranged on a substrate 51 as a constituent of the AWG 50. A first slab waveguide 55 for connection between the first channel waveguide 52 and the arrayed waveguides 54, as well as a second slab waveguide 56 for connection between the arrayed waveguide 54 and the second channel waveguides 53, are also arranged on the substrate 51. A transition region 61 for gently changing the state of connection is provided near one or both of the first and second slab waveguides 55, 56. A certain optical path length difference (waveguide length difference) $\Delta L$ is provided between adjacent arrayed waveguides 54. The optical path length is set so as to become gradually longer or shorter.

Next, the following description is provided about a basic operation of the AWG of this first embodiment.

Multiplexed optical signals of wavelengths $\lambda_1, \lambda_2, \ldots \lambda_n$ inputted to the first channel waveguides 52 are expanded their traveling path by the first slab waveguide 55 and are inputted at an equal phase to the arrayed waveguides 54. The optical signals thus inputted at an equal phase are each given a phase difference of a certain interval by the arrayed waveguides 54 and reach the second slab waveguide 56. Since there actually occurs wavelength dispersion, an isophase surface of each optical signal is inclined by the wavelength. As a result, the optical signals having been diffused by the second slab waveguide 56 have different light focusing (condensing) positions, depending on wavelengths. Therefore, the second channel waveguides 53 are arranged on a boundary surface of the second slab waveguide 56 and at positions corresponding to wavelengths. Thus, optical signals of wavelength components $\lambda_1, \lambda_2, \ldots \lambda_n$ are outputted each individually from the second channel waveguides 53. A light branching action and a light combining action are performed reversibly, and in the case where optical signals of wavelength components $\lambda_1, \lambda_2, \ldots \lambda_n$ are inputted each individually from the second channel waveguides 53, multiplexed optical signals of wavelengths $\lambda_1, \lambda_2, \ldots \lambda_n$ are outputted from the first channel waveguides 52.

The following description is now provided about the construction of the AWG according to this first embodiment.

Figure 5:
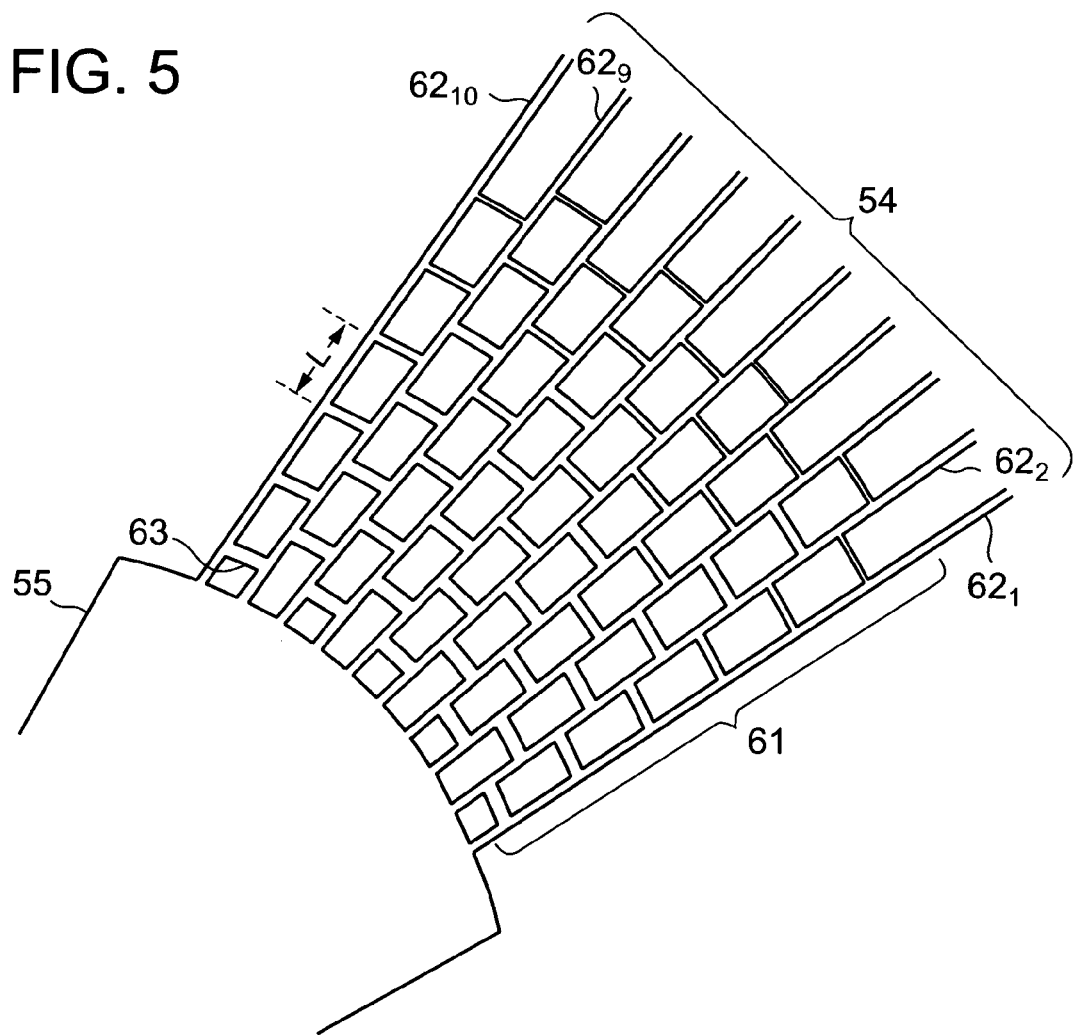
FIG. 5 is an enlarged plan view of connections between a first slab waveguide and arrayed waveguides shown in FIG. 4.

FIG. 5 concretely shows connections between the first slab waveguide 55 and the arrayed waveguides 54. The arrayed waveguides 54 are provided with a transition region 61 in the vicinity of their connections with the first slab waveguide 55. In the transition region 61, adjacent ones of waveguides $62_1, 62_2, \ldots, 62_{10}$, which constitute the arrayed waveguides 54 are connected through waveguide paths 63. The number and illustration of the waveguides are an example for explanation and no limitation is made thereto.

The waveguide paths 63 used in this embodiment are of the following structure.

The waveguide paths 63 are disposed on only one side at connection points to the waveguides $62_1, 62_2, \ldots, 62_{10}$. Unlike the conventional example of FIG. 3, the waveguide paths 63 do not intersect the waveguides $62_1, 62_2, \ldots, 62_{10}$.

The waveguide paths 63 used in this embodiment may be constructed as follows.

(1) In the transition region 61, the waveguide paths 63 are arranged at equal intervals L in the longitudinal direction of the waveguides $62_1, 62_2, \ldots, 62_{10}$.

(2) The waveguide paths 63 may be arranged such that the positions of connections between odd- and even-number waveguides in the waveguides $62_1, 62_2, \ldots, 62_{10}$ are dislocated by L/2 in the longitudinal direction. For example, the waveguide paths 63 which connect the waveguides $62_1$ and $62_2$ are dislocated by L/2 from the waveguide paths 63 which connect the waveguides $62_2$ and $62_3$.

The length L is about several μm to several ten μm, e.g., 20 μm. The height of cores which constitute the waveguides $62_1, 62_2, \ldots, 62_{10}$ and the waveguide paths 63 is in the range of about several μm to several ten μm, e.g., 7 μm. The core width of the waveguides $62_1, 62_2, \ldots, 62_{10}$ is about several μm to several ten μm, e.g., 7 μm. The width of each waveguide path 63 is about several μm to 20 μm, e.g., 7 μm.

(3) Several to several ten waveguide paths 63 are provided for each of the waveguides $62_1, 62_2, \ldots, 62_{10}$.

Further, following conditions may be added in this embodiment.

(4) In the transition region 61, the close to the first slab waveguide 55, the larger the thickness of each waveguide path 63. For example, the waveguide paths 63 are each about 18 μm wide at a position closest to the first slab waveguide 55 and about 2 μm wide at a position remotest from the first slab waveguide 55. This is because the closer to the first slab waveguide 55, the larger the amount of optical signals picked up after leaking between adjacent ones of the waveguides $61_2$, $62_2$, $62_4$, . . . , $62_{10}$.

(5) The waveguide paths 63 may be constituted by curved lines which are concentric with a curved line defined by input ends of the waveguides $62_1$, $62_2$, . . . , $62_{10}$.

Figure 1:
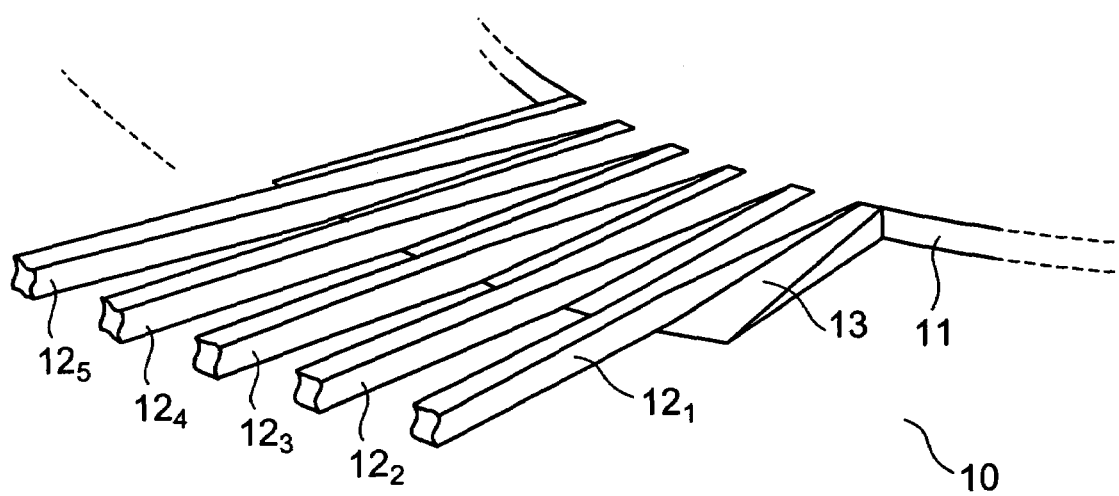
FIG. 1 is a perspective view showing a principal portion of an AWG (Arrayed Waveguide Grating type optical wavelength division multiplexer) as a first conventional example.
Figure 2:
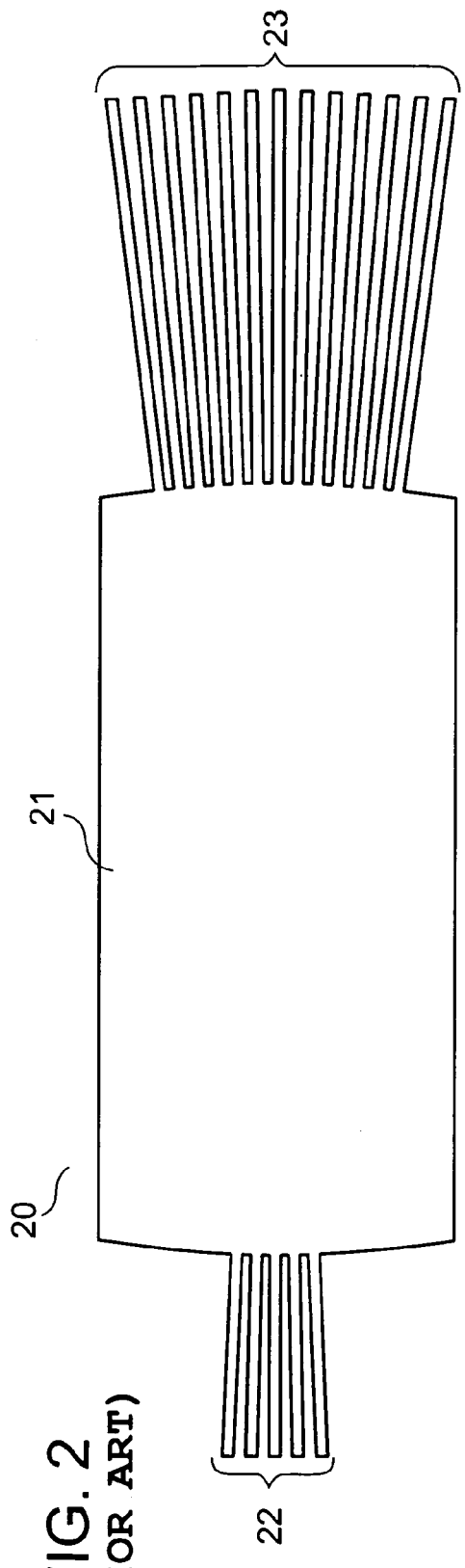
FIG. 2 is a plan view showing a slab waveguide and the vicinity thereof in a conventional ordinary AWG.
Figure 3:
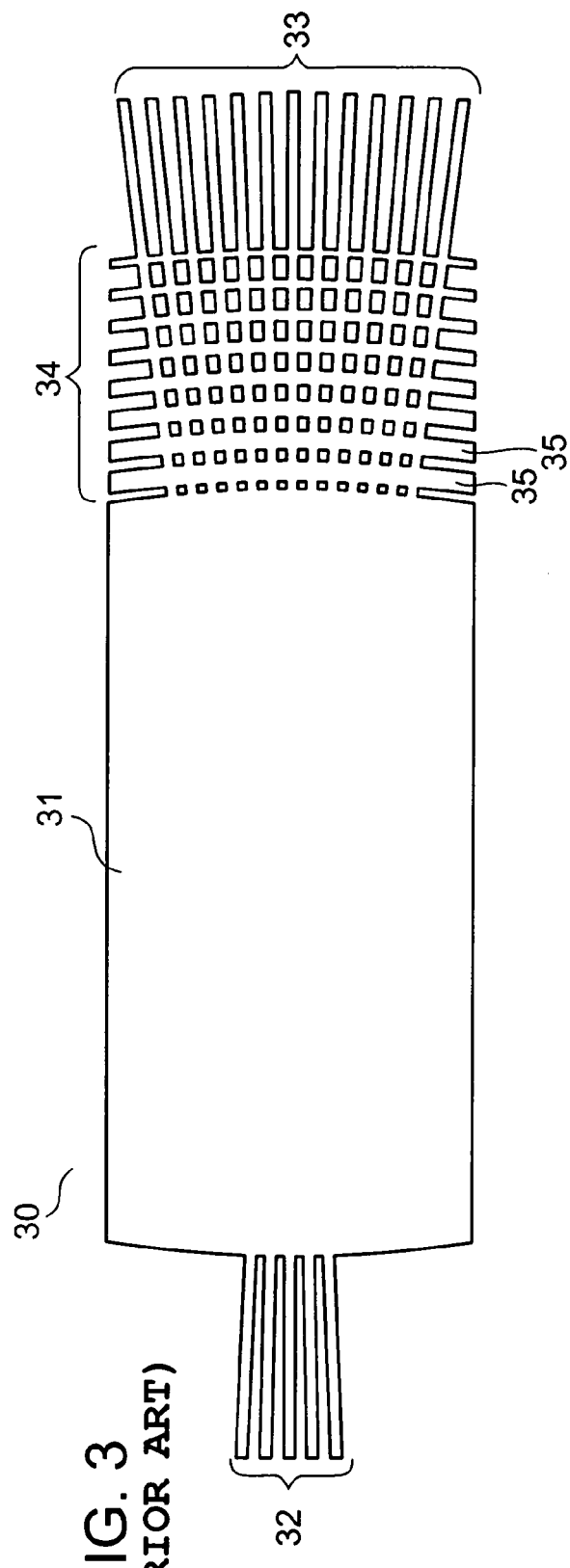
FIG. 3 is a plan view showing a slab waveguide and the vicinity thereof in an AWG as a second conventional example.

Under the above conditions, the reflection which occurs in the transition region 34 provided in the second conventional example shown in FIG. 3 decreases remarkably in the transition region 61 provided in this embodiment shown in FIG. 5. The reason is described as follows.

FIG. 6 is an enlarged diagram of a part of a transition region in the AWG of the second conventional example shown in FIG. 3 and FIG. 7. is an enlarged diagram of a part of a transition region in the AWG of this embodiment shown in FIG. 5.

A description will now be given of the AWG 30 of the second conventional example with reference to FIGS. 6A and 6B.

Figure 6A:
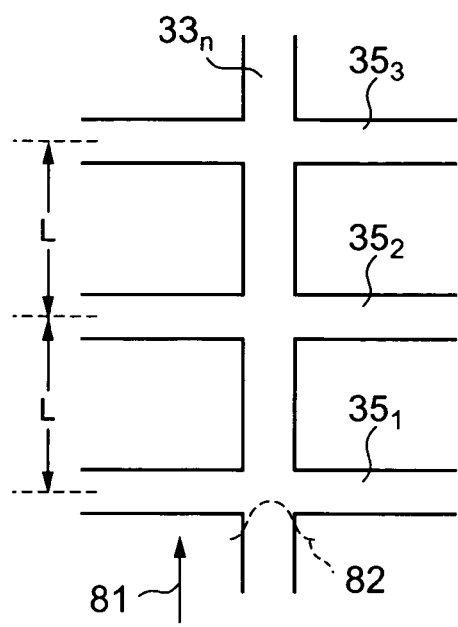
FIG. 6A is a construction diagram of a part of a transition region in the AWG shown in FIG. 3.
Figure 6B:
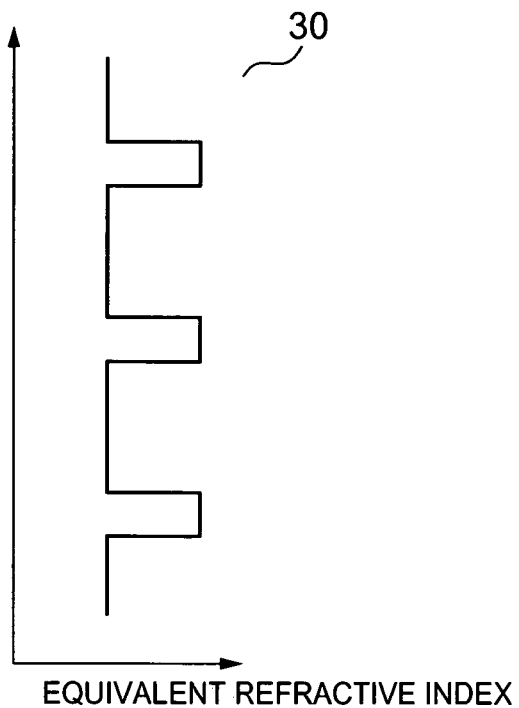
FIG. 6B is an explanatory diagram showing a change in refractive index thereof.

FIG. 6A shows a waveguide pattern in a transition region. Waveguide paths $35_1$, $35_2$, . . . intersect an output waveguides 33n. A optical signal 82 travels in the direction of arrow 81 through the output waveguide $33_n$. FIG. 6B shows a change in equivalent refractive index which the light traveling in the direction of arrow 81 through the waveguide senses. Thus, in the second conventional example, since waveguide paths are arranged on both sides while intersecting the output waveguide, there occurs a large change in equivalent refractive index. The change in equivalent refractive index is repeated at every distance L and with the same cycle. Therefore, out of slight reflected light portions which occur at intersecting points where the waveguide paths $35_1$, $35_2$, . . . intersect the output waveguide, only those of a specific wavelength strengthen each other. As a result, the reflection of the specific wavelength increases.

On the other hand, the AWG, indicated at 50, according to this embodiment will be described below with reference to FIGS. 7A and 7B.

Figure 7A:
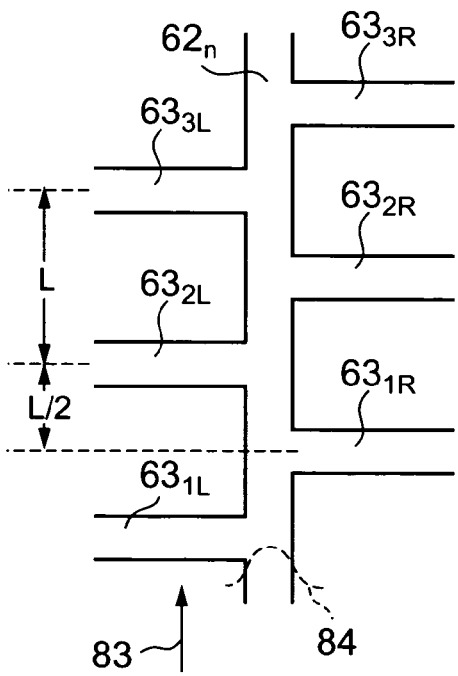
FIG. 7A is a construction diagram of a part of a transition region in the AWG shown in FIG. 4.
Figure 7B:
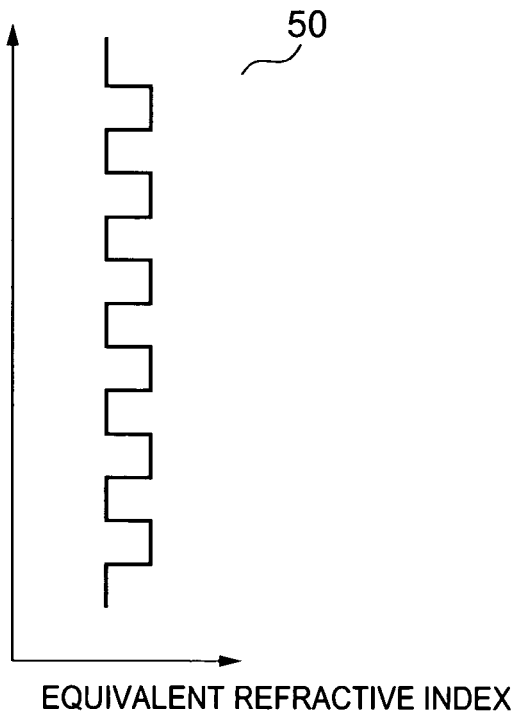
FIG. 7B is an explanatory diagram showing a change in refractive index thereof.

FIG. 7A shows a waveguide pattern in a transition region. Waveguide paths $63_{1R}$, $63_{2R}$, $63_{3R}$, $63_{1L}$, $63_{2L}$, and $63_{3L}$, are dislocated by L/2 with respect to an output waveguide $62_n$ and are connected on only one side. A optical signal 84 travels in the direction of arrow 83 through the output waveguide $62_n$. FIG. 7B shows a change in equivalent refractive index which the light traveling in the direction of arrow 83 through the waveguide senses. Thus, in FIG. 7B, since the waveguide paths are arranged on only side, there occurs only a relatively small change in equivalent refractive index. Consequently, the reflection of the optical signal by the waveguide paths $63_{1R}$, $63_{2R}$, $63_{3R}$, $63_{1L}$, $63_{2L}$, $63_{3L}$ becomes weaker. Thus, in this embodiment, a periodic change in equivalent refractive index in the transition region 61 shown in FIG. 5 is diminished to a large extent. As a result of such a decrease of a periodic change in equivalent refractive index, the reflection of a specific wavelength is decreased to a large extent. Accordingly, the AWG 50 of this embodiment can afford a satisfactory transmission characteristic.

Figure 8:
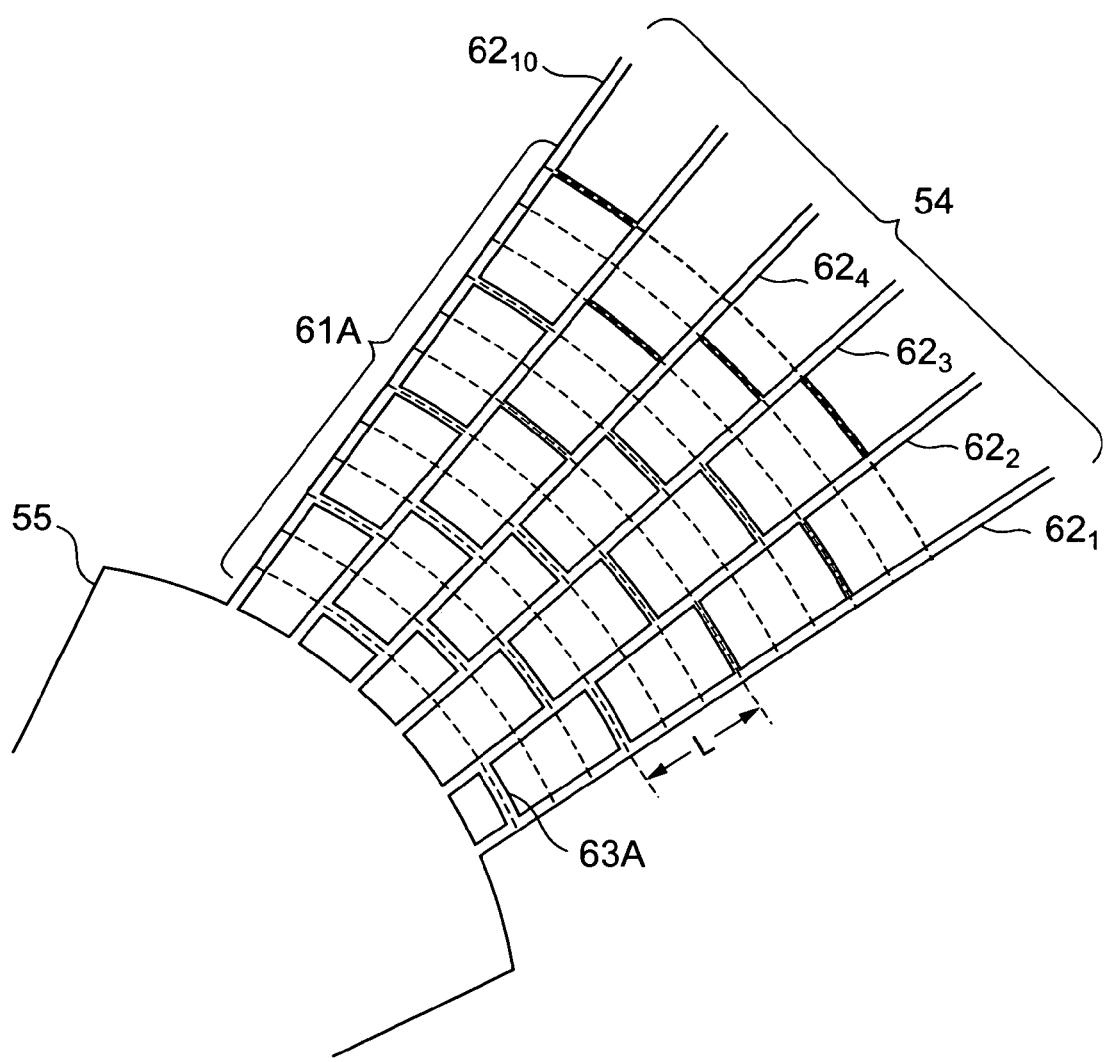
FIG. 8 is an enlarged plan view of connections between a first slab waveguide and arrayed waveguides in a first modification of the first embodiment.

FIG. 8 is an enlarged view of connections between the slab waveguide 55 and the arrayed waveguides 54 in a first modification of the first embodiment. In this first modification the arrayed waveguides 54 comprising waveguides $62_1$, $62_2$, . . . , $62_{10}$ are of the same layout structure as in the first embodiment. In a transition region 61A, adjacent ones of waveguides $62_1$, $62_2$, . . . , $62_{10}$ which constitute the arrayed waveguides 54 are connected together by waveguide paths 63A. The number and illustration of the waveguides are an example for explanation and no limitation is made thereto.

This first modification is the same as the first embodiment with respect to the conditions (1) and (3) referred to in the first embodiment, provided the condition (2) adopted therein is different from that in the first embodiment.

(2) The positions where the waveguide paths 63A connect the waveguides $62_1$, $62_2$, . . . , $62_{10}$ are dislocated by L/3 between adjacent waveguide paths. More specifically, waveguide paths 63A which connect the waveguides $62_4$ and $62_3$, waveguide paths 63A which connect the waveguides $62_3$ and $62_2$, and waveguide paths 63A which connect the waveguides $62_2$ and $62_1$, are dislocated by L/3 from one another. The waveguide paths 63A maybe arranged in a mutually L/3 dislocated manner in the direction opposite to the illustrated direction.

Also in this first modification, the same conditions as the conditions (4) and (5) in the first embodiment may be added.

In this first modification, the position where reflection occurs by the waveguide paths 63A changes 2/3 cycle every time. Therefore, the reflection of the wavelength which is amplified with cycle L can be inhibited effectively as in the first embodiment.

In the first embodiment the waveguide path 63 are arranged at every L/2 interval, while in this first modification the waveguide paths 63A are arranged at every L/3 interval. However, the mode of layout is not limited thereto. If n is assumed to be a positive integer other than "1," the waveguide paths may be arranged at intervals of L/n.

As shown in FIG. 8, the waveguide paths 63A may be formed by curved lines which are concentric with a curved line defined by connected ends of the waveguides $62_1$, $62_2$, . . . , $62_{10}$ where the waveguides are connected to the slab waveguide 55.

Figure 9:
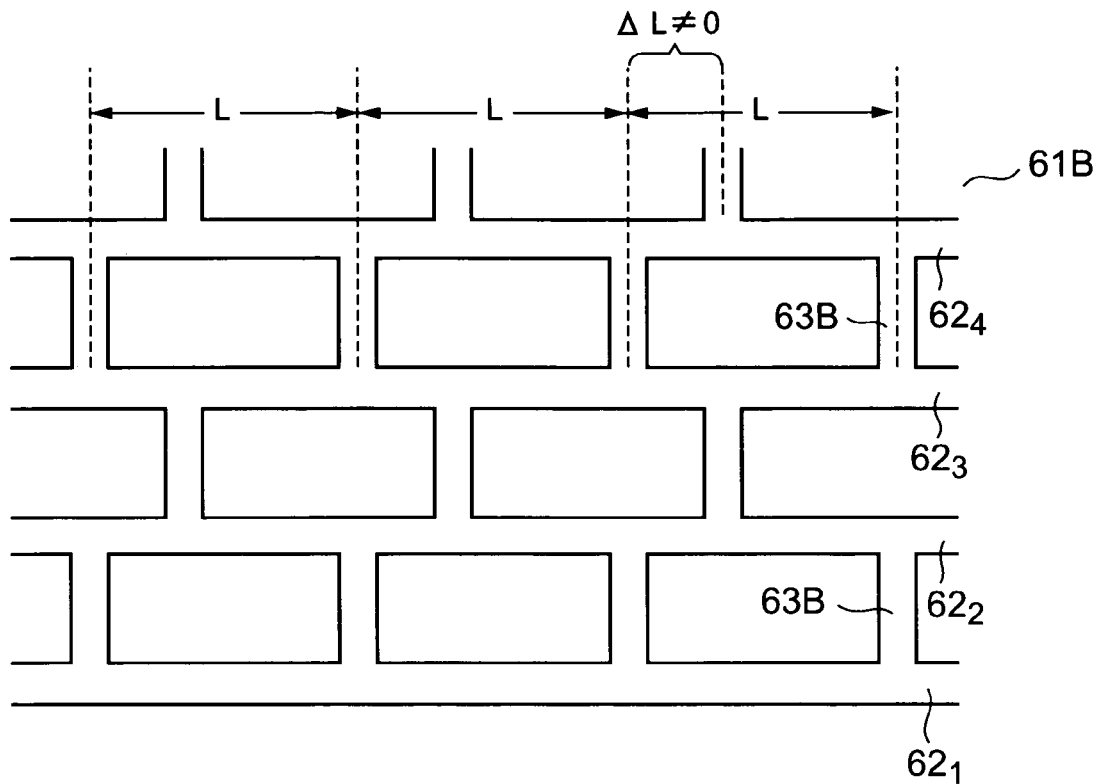
FIG. 9 is an enlarged plan view showing a part of a transition region in a second modification of the first embodiment.

FIG. 9 shows a part of a transition region in a second modification of the first embodiment. In this transition region, indicated at 61B, in the second modification, waveguide paths 63B arranged right and left of each of waveguides $62_1$, $62_2$, $62_3$, $62_4$, . . . are mutually dislocated by ΔL (≠0). By thus arranging the waveguide paths 63B so as not to be at equal intervals in the longitudinal direction of the waveguides $62_1$, $62_2$, $62_3$, $62_4$, . . . , it is possible to suppress the amplification of the reflected wavelength as in the first modification.

Thus, in this second modification, the waveguide paths 63B are mutually dislocated by ΔL so as not to intersect the waveguides $62_1$, $62_2$, $62_3$, $62_4$, . . . . Consequently, the change in equivalent refractive index which is sensed during propagation of light is weakened. This construction of the second modification is a more generalized construction of the first embodiment shown in FIG. 5 or of the first modification shown in FIG. 8.

Figure 10:
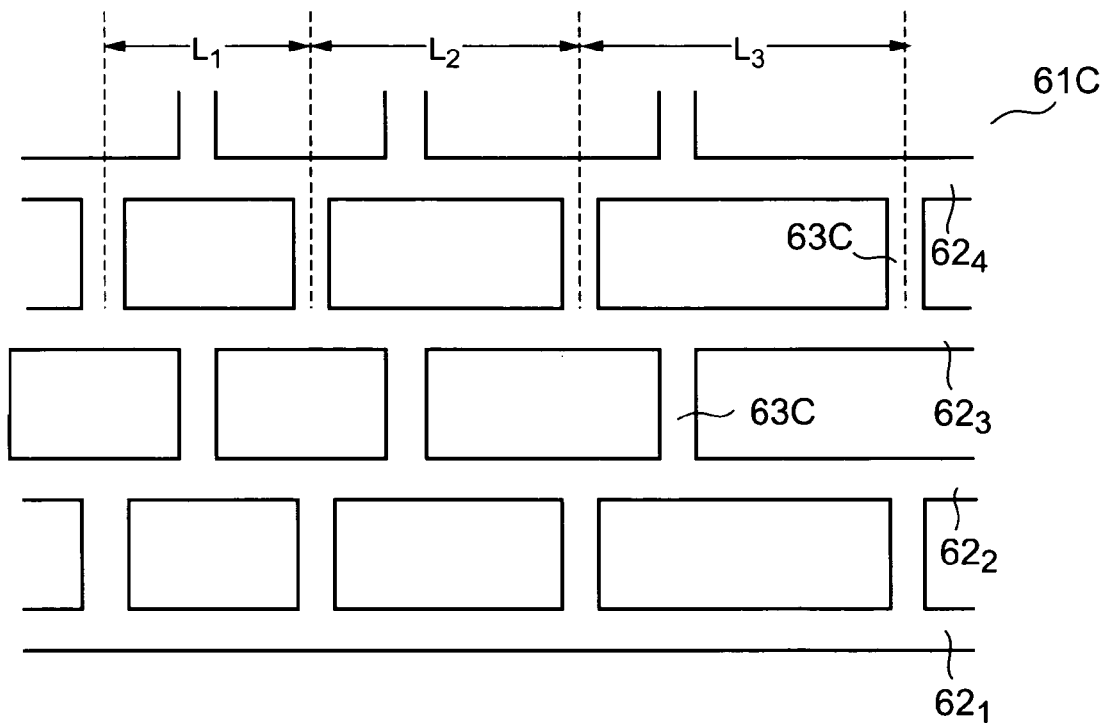
FIG. 10 is an enlarged plan view showing a part of a transition region in a third modification of the first embodiment.

FIG. 10 shows a part of a transition region in a third modification of the first embodiment. In the transition region, indicated at 61C, in this third modification, unlike the previous embodiment and modifications, layout intervals $L_1, L_2, L_3, \ldots L_n$ ($L_n$ is not shown) become longer gradually in the direction away from the first slab waveguide 55 shown in FIG. 5 or FIG. 8. Three intervals $L_1$, $L_2$, and $L_3$ shown in the figure are in such a relation of magnitude as shown by the following expression (1):

$$L_1 < L_2 < L_3 \quad (1)$$

Thus, the layout intervals $L_1$, $L_2$, $L_3$, ..., $L_n$ of the waveguide paths 63C are made longer with separation from the first slab waveguide 55. This is because, in the optical signals leaking out among the waveguides $62_1$, $62_2$, $62_3$, $62_4$, ..., $62_n$, the amount of optical signals picked up becomes smaller as the distance from the first slab waveguide 55 becomes longer. This reason is common to the reason why the width of the waveguide paths 61A is set so as to become smaller with separation from the first slab waveguide 55. In this third modification, even the waveguide paths 63C arranged between the same waveguides are different in their intervals $L_1$, $L_2$, $L_3$, ..., $L_n$. Therefore, the reflection of a specific frequency can be prevented more effectively from being amplified.

Figure 11:
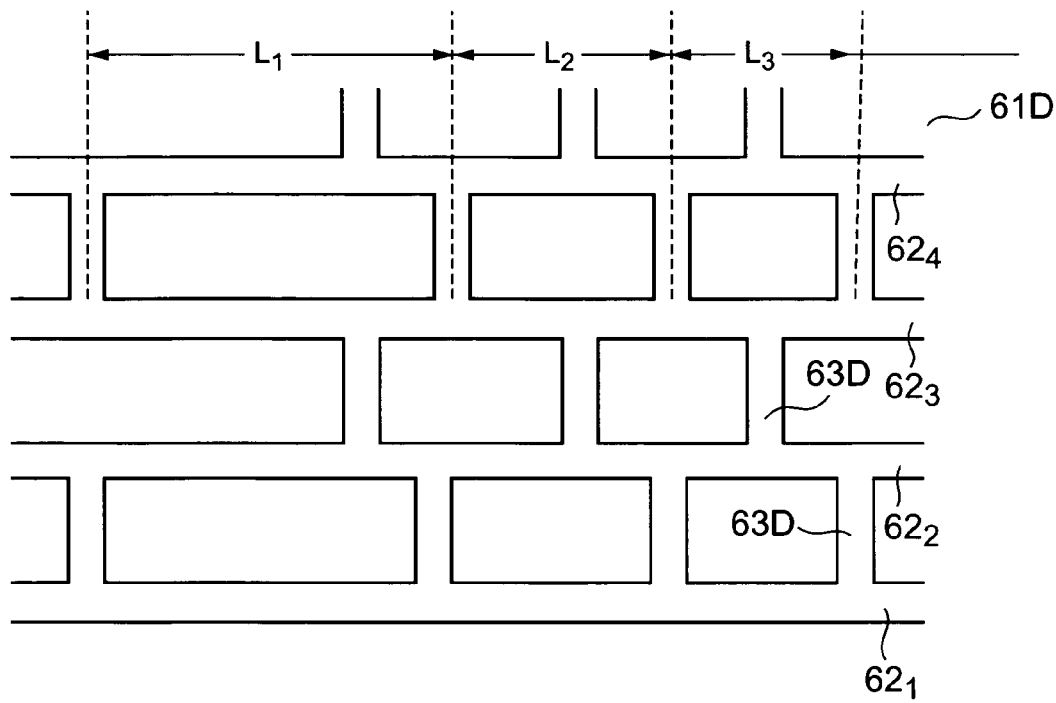
FIG. 11 is an enlarged plan view showing a part of a transition region in a fourth modification of the first embodiment.

In the constructions described above, the intervals of waveguide paths have a certain regularity. However, even by such waveguide paths' intervals as have no regularity but merely change at random, there can be obtained the same effects as above. FIG. 11 shows a part of a transition region in a fourth modification of the first embodiment. In the transition region, indicated at 61D, in this fourth modification, waveguide paths 63D are arranged at random intervals L1, L2, L3, ....

$$L_1 \neq L_2, L_2 \neq L_3, L_1 \neq L_3 \quad (2)$$

With this layout, in the longitudinal direction of waveguides $62_1$, $62_2$, $62_3$, $62_4$, ..., the reflection-occurring wavelength can be changed at random, whereby it is possible to prevent the occurrence of a periodic reflection of optical signals and hence possible to diminish accumulation of the reflection of specific wavelength optical signals.

Figure 12:
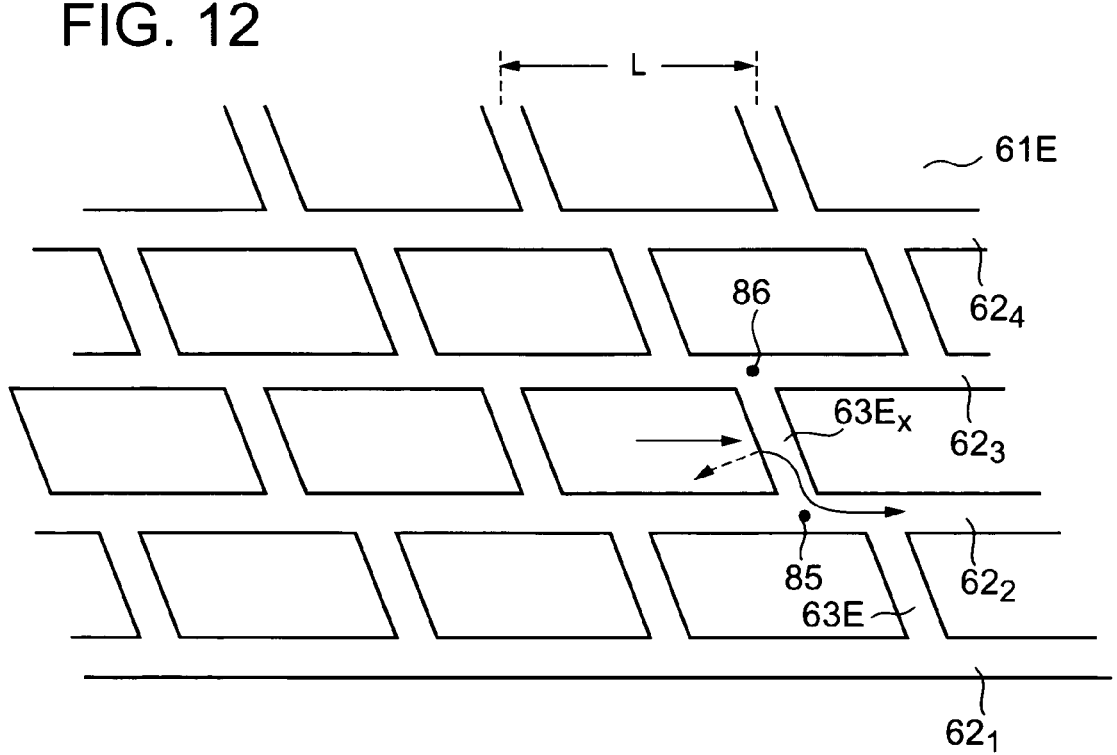
FIG. 12 is an enlarged plan view showing a part of a transition region in a fifth modification of the first embodiment.

FIG. 12 shows a part of a transition region in a fifth modification of the first embodiment. In the transition region, indicated at 61E, in this fifth modification, waveguide paths 63E which connect mutually adjacent waveguides $62_1$, and $62_2$, $62_2$ and $62_3$, $62_3$ and $62_4$, are each inclined at a predetermined angle. Therefore, the waveguide paths 63E are connected at different positions in the longitudinal direction of waveguides $62_1$, $62_2$, $62_3$, $62_4$, .... As result, refractive index change points are present at different positions. For example, a waveguide path $63E_x$ which connects the waveguides $62_2$ and $62_3$ gives rise to refractive index change points 85 and 86 at different positions.

As a result, a periodic change in refractive index between waveguides is decreased, whereby the amplification of the reflection of specific wavelength optical signals can be further diminished. In this fifth modification there also accrues an advantage that leaking light picked up by the waveguide path $63E_x$ is easy to be sent to the waveguide $62_2$ located on the side where the waveguide path is inclined in the light traveling direction. In this fifth modification, moreover, since the waveguide path $63E_x$ is not perpendicular to the light traveling direction, there is obtained an effect such that light reflected here is difficult to return into the slab waveguide.

Figure 13:
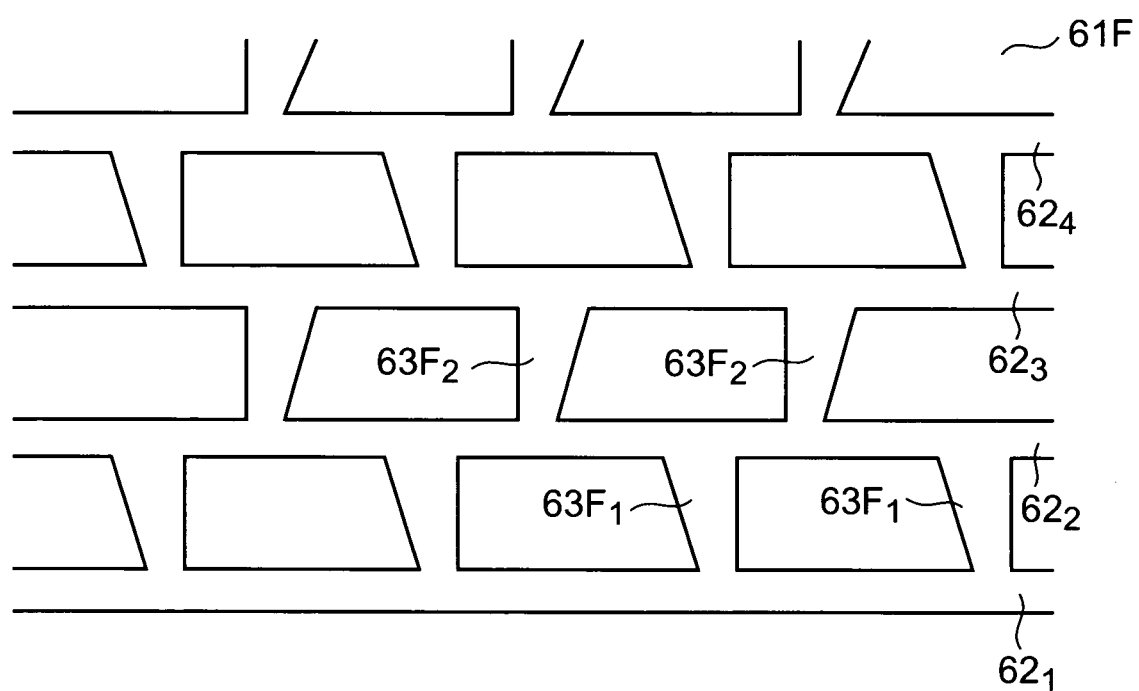
FIG. 13 is an enlarged plan view showing a part of a transition region in a sixth modification of the first embodiment.

FIG. 13 shows a part of a transition region in a sixth modification of the first embodiment. In the transition region, indicated at 61F, in this sixth modification, first waveguide paths 63F are wider in one direction. In the same figure, first waveguide paths $63F_1$ and second waveguide paths $63F_2$ have mutually reversed shapes. Thus, the shape of waveguide paths can be selected freely as long as the shape selected does not intersect each waveguide.

Figure 14:
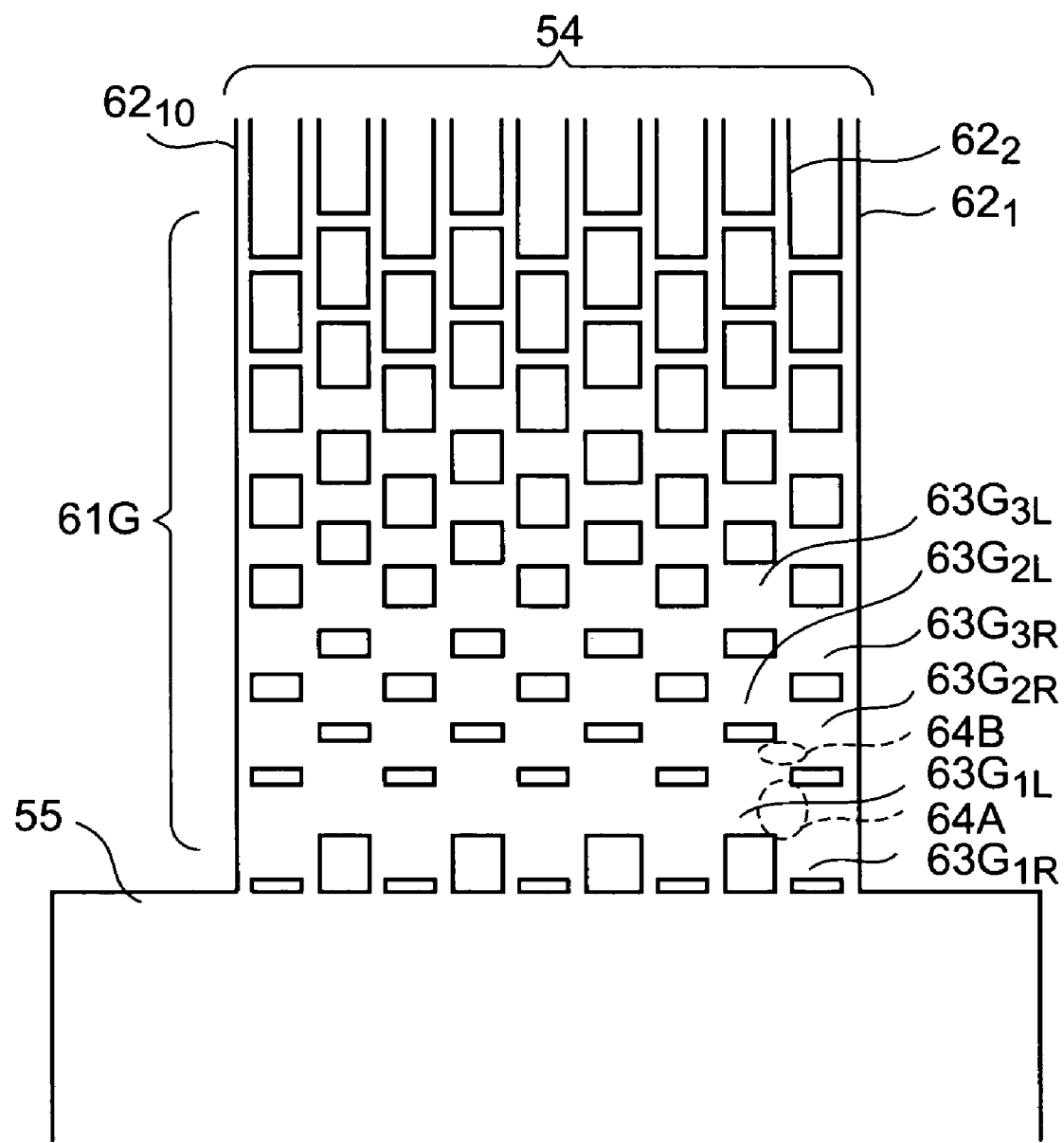
FIG. 14 is an enlarged plan view of connections between a first slab waveguide and arrayed waveguides in a seventh modification of the first embodiment.

FIG. 14 is an enlarged plan view of connections between a first slab waveguide and arrayed waveguides in a seventh modification of the first embodiment. In this seventh modification, as in the first embodiment shown in FIG. 5, adjacent waveguide paths are arranged so that their axes are mutually dislocated by L/2 cycle or so as an example. However, the amount of variation in width of the waveguide paths 63 is still larger. Therefore, in the vicinity of the first slab waveguide 55, there is a region in which a waveguide path is wider and overlaps a waveguide path adjacent thereto. More particularly, a waveguide path $63G_{1R}$ and a waveguide path $63G_{1L}$ adjacent thereto overlap each other in a region 64A connected to a waveguide $62_2$. Likewise, between waveguide paths $63G_{1L}$ and $63_{2R}$ adjacent thereto, there is an overlapping region 64B with respect to the waveguide $62_2$. Thus, overlapping regions with respect to the waveguide $62_2$ are present up to a waveguide path $63G_{3L}$. Waveguide paths which follow the waveguide path $63G_{3L}$ do not overlap because they are smaller in width.

Thus, adjacent waveguide paths may include an overlapping region insofar as their center axes are deviated from each other. Consequently, the design freedom becomes larger. As shown in FIG. 14, it becomes possible to further increase the amount of change in the guide path width relative to the distance from the slab waveguide. The density of leaking light is high in the vicinity of the slab waveguide. In the vicinity of the slab waveguide, therefore, leaking light can be picked up efficiently by enlarging the width of waveguide paths. At positions distant from the slab waveguide, the density of leaking light is low and therefore, as shown in FIG. 14, the waveguide path width maybe made smaller to avoid overlapping of adjacent waveguide paths. By so doing, it is possible to prevent the leakage of light from waveguides 62 to waveguide paths $63G_{nR}$ and $63G_{nL}$ (n is an integer of, for example, 4 or more).

Figure 15:
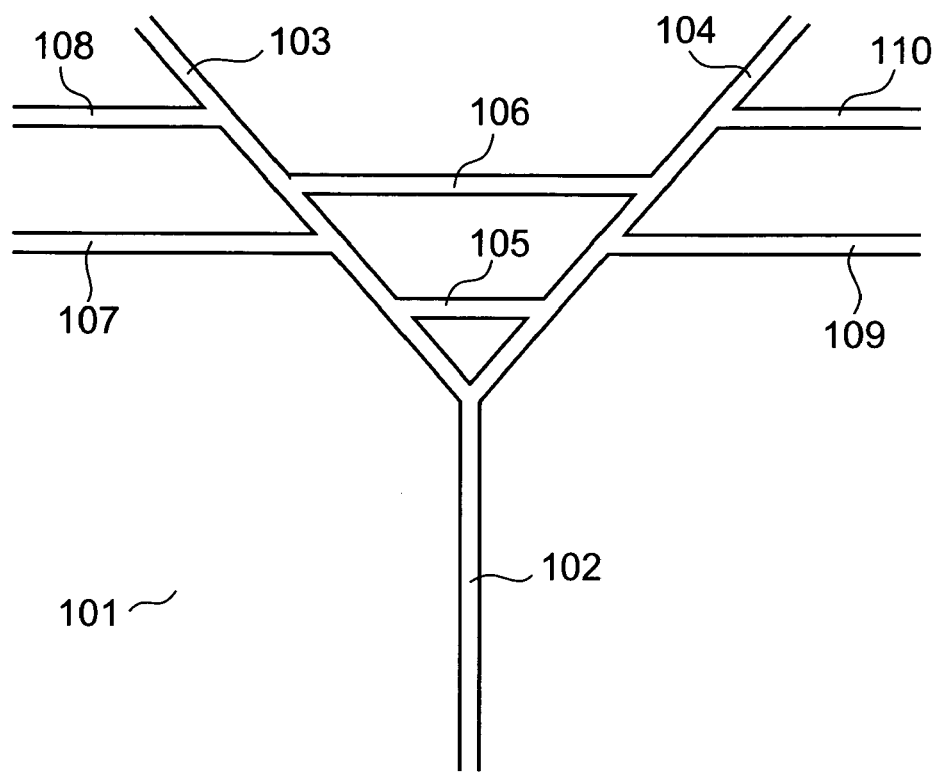
FIG. 15 is a plan view showing the construction of a beam splitter according to a second embodiment of the present invention.

FIG. 15 shows the construction of a beam splitter according to a second embodiment of the present invention. This beam splitter, indicator at 101, includes a single input waveguide 102 and first and second output waveguides 103, 104 for branching in two directions the light traveling through the input waveguide 102. Waveguide paths 105 to 110 for picking up light which leaks from the first output waveguide 103 or the second output waveguide 104 at the time of branching are provided at positions relatively close to the branching point of the first and second output waveguides 103, 104. The number, width and distance from the branching point of the waveguide paths 105 to 110 are the same as in the first embodiment. The size of the first and second output waveguides 103, 104 is also the same as in the first embodiment.

In the beam splitter 101 of this second embodiment, as in the first embodiment, the waveguide paths 105-110 do not intersect the output waveguides 103 and 104. Therefore, it is possible to prevent an abrupt change in equivalent refractive index, and is possible to diminish the reflection of a optical signal of a specific wavelength.

Figure 16:
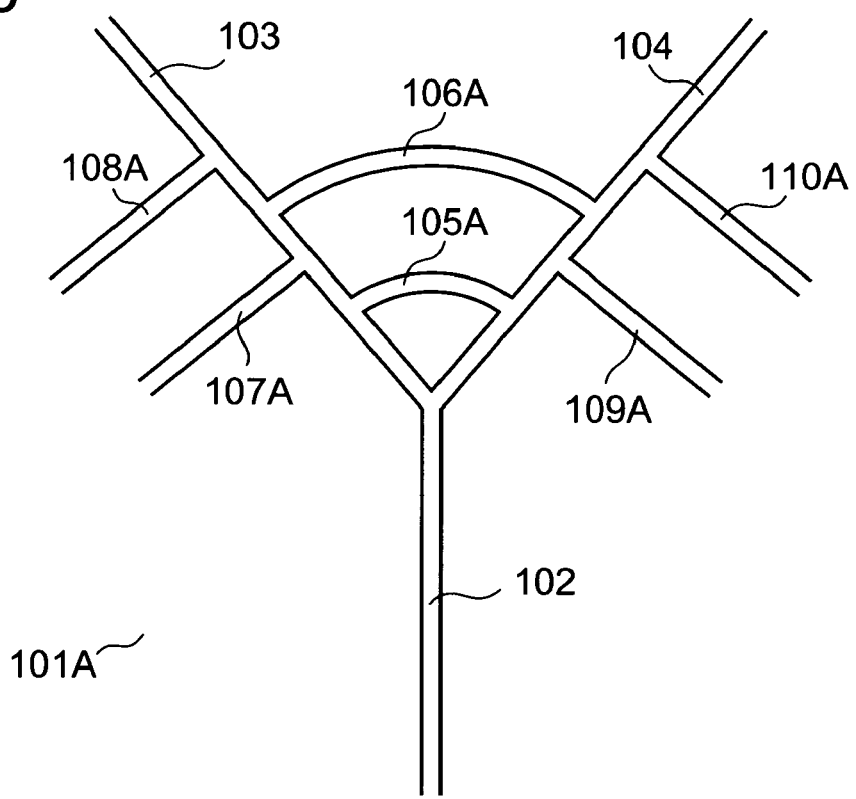
FIG. 16 is a plan view showing the construction of a beam splitter according to a first modification of the second embodiment.

FIG. 16 shows the construction of a beam splitter according to a first modification of the second embodiment. In the beam splitter, indicated at 101A, of this first modification, waveguide paths 105A to 110A are connected substantially perpendicularly to the output waveguides 103 or 104. The waveguide paths 105A and 106A are curved and provide connections between the output waveguides 103 and 104.

Figure 17:
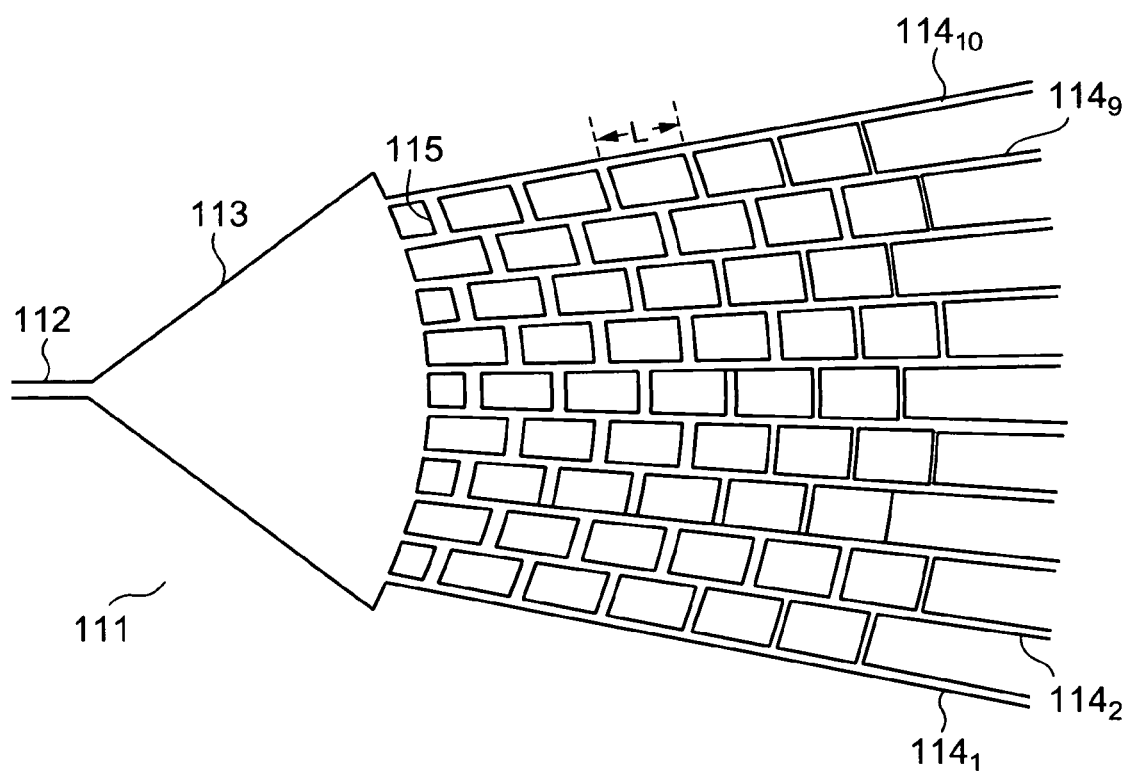
FIG. 17 is a plan view showing the construction of a beam splitter according to a second modification of the second embodiment.

FIG. 17 shows the construction of a beam splitter according to a second modification of the second embodiment. The beam splitter, indicated at 111, of this second modification includes a single input waveguide 112, a beam diffusing segment 13 such as a slab waveguide for diffusing light inputted from the input waveguide 112, plural waveguides $114_1, 114_2, \ldots, 114_{10}$ arranged on an output side of the beam diffusing segment 113 radially at certain intervals, and waveguide paths 115 each connecting adjacent ones of the waveguides $114_1, 114_2, \ldots, 114_{10}$. Since the relation between the waveguides $114_1, 114_2, \ldots, 114_{10}$ and the waveguide paths 115 is the same as in the first embodiment, a concrete explanation thereof will here be omitted.

Although in this example the number of the input waveguide is set at unity, it may be set at N to constitute an N×M optical coupler.

As set forth above, the present invention has the following effects.

Waveguide paths for connecting output waveguides are arranged on only one side at the points of connection with the output waveguides. Therefore, as compared with crossed waveguides, it is possible to diminish the change in equivalent refractive index and improve the transmission characteristic of optical signals.

While this invention has been described in connection with certain preferred embodiments, it is to be understood that the subject matter encompassed by way of this invention is not to be limited to those specific embodiments. On the contrary, it is intended for the subject matter of the invention to include all alternative, modification and equivalents as can be included within the spirit and scope of the following claims.

What is claimed is:

1. An optical coupler comprising:
   a slab waveguide;
   one or more input waveguides for inputting optical signals to the slab waveguide;
   a plurality of output waveguides for outputting optical signals from the slab waveguide; and
   a plurality of waveguide paths for connecting adjacent ones of the output waveguides at respective connection points;
   wherein each of the waveguide paths is disposed at only; and one side of each connection point to one of the output waveguides.

2. An optical coupler according to claim 1, wherein the waveguide paths connect a certain one of the output waveguides to the output waveguides adjacent thereto alternately right and left.

3. An optical coupler according to claim 1, wherein adjacent ones of the waveguide paths are mutually dislocated in the longitudinal direction of the output waveguides.

4. An optical coupler according to claim 1, wherein the waveguide paths are arranged at random intervals in the longitudinal direction of the output waveguides.

5. An optical coupler according to claim 1, wherein the waveguide paths are arranged at intervals which become gradually longer in the longitudinal direction of the output waveguides.

6. An optical coupler according to claim 1, wherein the waveguide paths connect the output waveguides at equal intervals L.

7. An optical coupler according to claim 6, wherein adjacent ones of the waveguide paths are mutually dislocated by an interval of L/n (n is an integer of 1 or more).

8. An optical coupler according to claim 1, wherein the waveguide paths become narrower with separation from the slab waveguide.

9. An optical coupler according to claim 1, wherein the waveguide paths connect adjacent ones of the output waveguides at positions equal in the distance from the slab waveguide.

10. An optical coupler according to claim 1, wherein the waveguide paths connect adjacent ones of the output waveguides at positions different in the distance from the slab waveguide.

11. An optical coupler according to claim 1, wherein the waveguide paths are inclined relative to the output waveguides.

12. An optical coupler according to claim 1, wherein the waveguide paths are equal in width between the output waveguides which the waveguide paths connect.

13. An optical coupler according to claim 1, wherein the waveguide paths are different in width between the output waveguides which the waveguide paths connect.

14. A beam splitter comprising:
    an input waveguide a slab waveguide;
    a plurality of output waveguides connected to the input waveguide for inputting signal to said slab waveguide to output optical signals; and
    a plurality of waveguide paths for connecting adjacent ones of the output waveguides at respective connection points;
    wherein each of the waveguide paths is disposed at one side of each connection point to one of the output waveguides.

15. A beam splitter according to claim 14, wherein the waveguide paths are arranged at random intervals in the longitudinal direction of the output waveguides.

16. A beam splitter according to claim 14, wherein the waveguide paths are arranged at intervals which become gradually longer in the longitudinal direction of the output waveguides.

17. A beam splitter according to claim 14, wherein the waveguide paths connect the output waveguides at equal intervals.

18. A beam splitter according to claim 14, wherein the waveguide paths become narrower with separation from the input waveguide.

19. An arrayed waveguide grating type optical wavelength division multiplexer comprising:
    one or more input waveguides for the input of optical signals;
    a first slab waveguide coupled to the input waveguides to branch the optical signals;
    a plurality of arrayed waveguides coupled to another side of the first slab waveguide to impart a phase difference to each of the optical signals;
    a second slab waveguide coupled to another side of the arrayed waveguides to branch and output the optical signals;
    a plurality of output waveguides coupled to another side of the second slab waveguide to output the optical signals; and
    waveguide paths for connecting adjacent ones of the arrayed waveguides, the waveguide paths being positioned near one or both of the first and second slab waveguides at respective connection points;
    wherein each of the waveguide paths is disposed at only; and one side of each connection point to one of the output waveguides.

20. An arrayed waveguide grating type optical wavelength division multiplex according to claim 19, wherein the waveguide paths connect a certain one of the arrayed waveguides to the arrayed waveguides adjacent thereto alternately right and left.

21. An arrayed waveguide grating type optical wavelength division multiplexer according to claim 19, wherein adjacent ones of the waveguide paths are mutually dislocated in the longitudinal direction of the arrayed waveguides.

22. An arrayed waveguide grating type optical wavelength division multiplexer according to claim 19, wherein the waveguide paths are arranged at random intervals in the longitudinal direction of the arrayed waveguides.

23. An arrayed waveguide grating type optical wavelength division multiplexer according to claim 19, wherein the waveguide paths are arranged at intervals which become gradually longer in the longitudinal direction of the arrayed waveguides.

24. An arrayed waveguide grating type optical wavelength division multiplexer according to claim 19, wherein the waveguide paths connect the arrayed waveguides at equal intervals L.

25. An arrayed waveguide grating type optical wavelength division multiplexer according to claim 24, wherein adjacent ones of the waveguide paths are mutually dislocated by an interval of L/n (n is an integer of 1 or more).

26. An arrayed waveguide grating type optical wavelength division multiplexer according to claim 19, wherein the waveguide paths become narrower with separation from the first or the second slab waveguide.

27. An arrayed waveguide grating type optical wavelength division multiplexer according to claim 19, wherein the waveguide paths connect adjacent ones of the arrayed waveguides at positions equal in the distance from the first or the second slab waveguide.

28. An arrayed waveguide grating type optical wavelength division multiplexer according to claim 19, wherein the waveguide paths connect adjacent ones of the arrayed waveguides at positions different in the distance from the first or the second slab waveguide.

29. An arrayed waveguide grating type optical wavelength division multiplexer according to claim 19, wherein the waveguide paths are inclined relative to the arrayed waveguides.

30. An arrayed waveguide grating type optical wavelength division multiplexer according to claim 19, wherein the waveguide paths are equal in width between the arrayed waveguides which the waveguide paths connect.

31. An arrayed waveguide grating type optical wavelength division multiplexer according to claim 19, wherein the waveguide paths are different in width between the arrayed waveguides which the waveguide paths connect.

* * * * *